April 8, 1930.  C. W. CARTER ET AL  1,753,879
PROCESS OF FRYING BACON
Filed Jan. 26, 1928   2 Sheets-Sheet 2
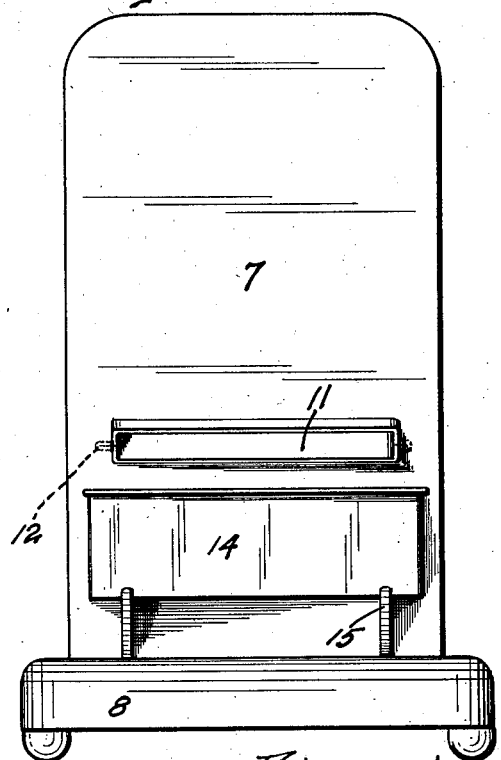
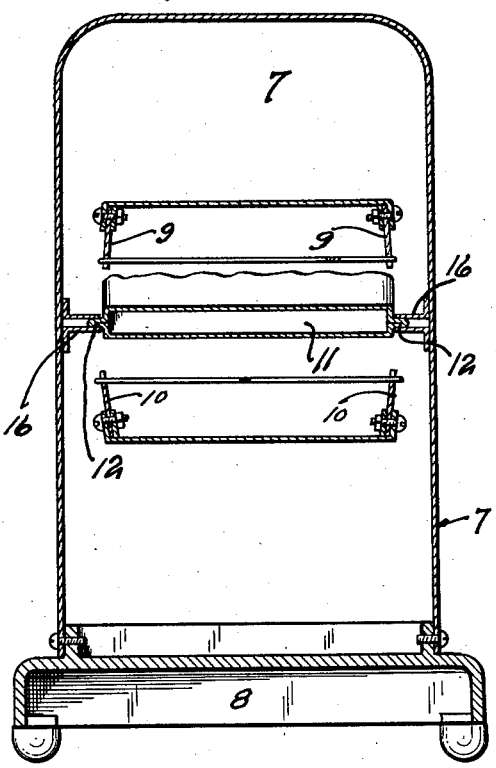
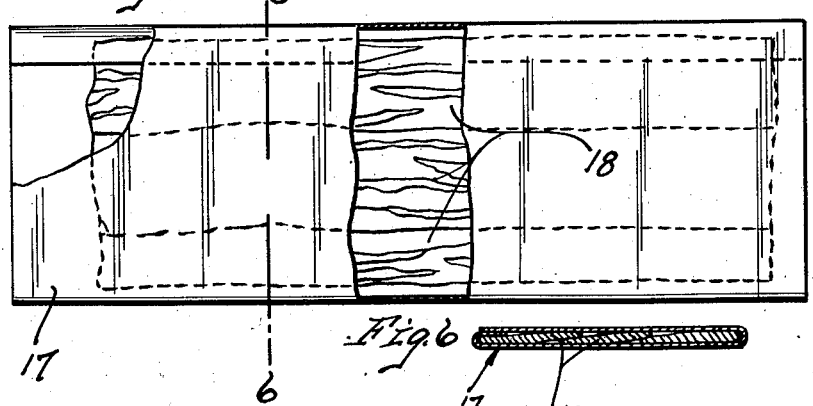
Inventors
Clarence W. Carter
Charles P. Strite
By their Attorneys Patented Apr. 8, 1930

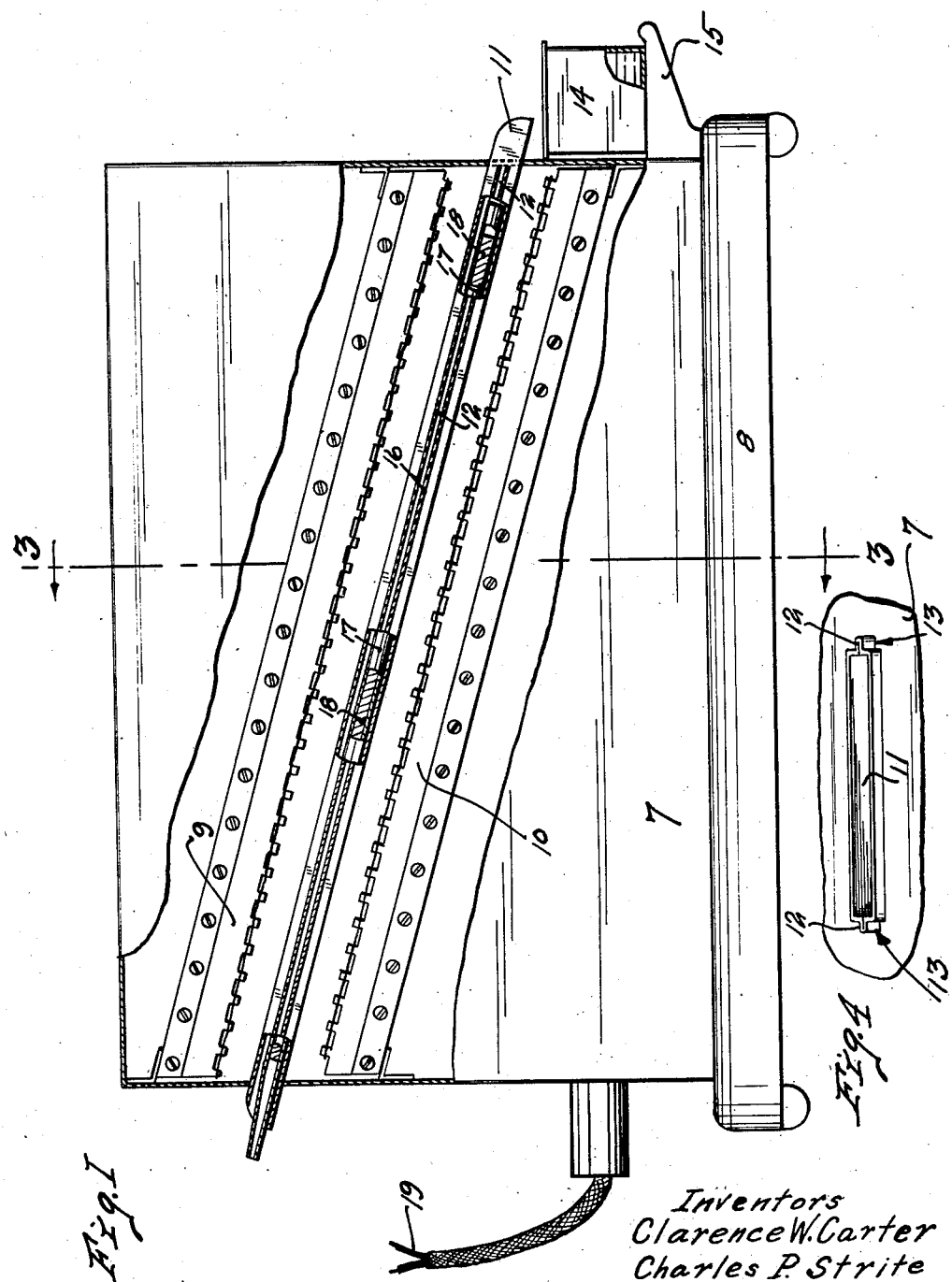

1,753,879

UNITED STATES PATENT OFFICE

CLARENCE W. CARTER AND CHARLES P. STRITE, OF MINNEAPOLIS, MINNESOTA

PROCESS OF FRYING BACON

Application filed January 26, 1928. Serial No. 249,557.

Our present invention relates to an improved method or process of frying bacon or other thinly sliced meat, and, generally stated, the invention consists of the novel steps of manipulation or operation hereinafter described and defined in the claims.

In the ordinary process of frying bacon, wherein the thinly cut strips of bacon are laid loosely on the bottom of a pan, it is practically impossible to prevent the bacon from curling up, even when great care is taken to repeatedly turn the same. Curled bacon shrinks and warps out of shape in such a way that it is not attractive in appearance and does not lie well in sandwiches or the like, and, moreover, when the bacon is cooked in its own grease, the cooked product will be grease-soaked and not as palatable as when fried under conditions that leave the same in drier condition.

We have found that, by placing strips of bacon in a flat containing folder, such as afforded by a sheet of quite stiff waxed paper, the bacon can be subjected to frying heat and will be held in perfectly flat condition while it is being fried. We have also found that in the use of such containing folders, having open ends or at least having an open lower end, and by suspending or supporting the bacon-containing folder at an angle to a horizontal while it is being subjected to the frying or cooking heat, the grease from the bacon will freely flow out of the open lower end of the folder and will leave the fried or cooked bacon in substantially flat condition and comparatively free from grease. Bacon thus cooked has been found to have the very best flavor and to be much more palatable than bacon cooked in its own grease.

It would be practically impossible to properly place individual strips of bacon within the frying trough, but when the bacon strips are placed within the paper folder the insertion is a very easy matter. At the packing house the bacon strips will be cut while the bacon is very cold and hence quite rigid, and at which time the cold bacon strips may be conveniently and properly placed in the folder.

An apparatus suitable for carrying out the improved process and which apparatus is disclosed and claimed in our prior application Serial No. 164,640 filed Jan. 29, 1927, is illustrated in the accompanying drawings, wherein like characters indicate like parts throughout the several views.

Referring to the drawings:

Fig. 1 is a side elevation with some parts broken away and some parts sectioned, showing the apparatus;

Fig. 2 is a front end elevation of the apparatus;

Fig. 3 is a transverse vertical section taken on the line 3—3 of Fig. 1;

Fig. 4 is a fragmentary view in front elevation, illustrating the manner in which a tubular frying trough is inserted through the rear wall of the casing;

Fig. 5 is a plan view with some parts broken away, showing the paper folder and strips of bacon contained therein; and Fig. 6 is a section taken on the line 6—6 of Fig. 5.

In the apparatus illustrated, the numeral 7 indicates a rectangular or box-like sheet metal casing secured on a base 8. Within the casing is a pair of vertically spaced obliquely set electrical heating elements, which may be of any suitable or approved construction and which are indicated as entireties by the numerals 9 and 10.

The numeral 11 indicates a frying trough in the form of a flat sheet metal tube provided at its edges with outstanding longitudinal flanges 12. This tubular trough 11 is inserted in an oblique position midway between the heating elements 9 and 10 and is extended through the rear and front plates of the casing. The rear plate of the casing is provided with notches 13 that freely pass the flanges 12 therethrough, but the front plate of said casing is not provided with such notches and the front ends of the flanges 12, in the structure illustrated, come against the front plate of said casing and limit the downward and forward movement of the frying trough substantially to the position shown in Fig. 1, and in which position, both ends thereof project. The projecting front and lower end of the trough 11 is in a position to discharge the grease into a catch pan 14 shown as detachably mounted on brackets 15 secured to the casing.

Secured to the inner surfaces of the side walls of the casing 7 are vertically spaced oblique guide flanges 16, between which the flanges 12 of the trough 11 are extended and by which the trough is guided and held in its inclined position shown in Fig. 1. The waxed paper folder 17 is preferably made from a flat sheet bent into the form of a flat container having overlapping longitudinal edges and open at both ends. This folder encases and holds in flat condition a plurality of strips of bacon 18, (see particularly Figs. 5 and 6). Preferably also, the folder is longer than the bacon strips.

In Fig. 1, the numeral 19 indicates current-supplying leads that extend from a suitable source and will be connected to the heating elements 9 and 10 in any suitable manner, not necessary for the purpose of this case to consider.

In the construction illustrated, the tubular trough 11 is readily removable, but except for cleaning the same, its removal will seldom be necessary. The folder 17 with the bacon strips contained therein may be readily slipped into the tubular trough 11 and the bacon will be properly positioned when the upper end of the envelope is left slightly projecting from the upper end of the trough.

While the bacon is being fried, the grease will continuously run therefrom and into the catch pan 14. When the bacon has been properly fried or cooked, the folder containing the same may be readily removed.

In practice, it has been found that the heat required to properly fry or cook the bacon will not cause the paper folder to disintegrate, and hence, that the folder with its cooked contents may be readily removed as an entirety and, when opened up, will expose the properly cooked bacon in substantially flat condition.

It is important to note that the bacon strips within the flat folder are subjected to cooking heat applied thereto through both of the flat walls of the folder. This not only causes the bacon to be rapidly cooked or broiled but to be evenly cooked or broiled on both sides.

It is proposed to have the bacon packed in the paper-containing envelopes at the packing plant and sold to the trade with each envelope containing a plurality of thinly cut bacon strips in condition for frying in the envelope as above described. In fact, it has been found that packers welcome such scheme, largely for the reasons stated by them that they take great care to produce a high grade bacon and that much of its fine qualities are lost under the hitherto common practice of frying the same.

Of course, the process and apparatus can be used for frying or cooking thinly cut meats or food other than bacon. Salt pork, cut in thin slices, may be fried to dry, crisp condition and will be found much more palatable than when fried in its own grease. Moreover the frying of the bacon or the like in the envelope, which holds the same in flat condition, makes it possible to use bacon cut into very thin slices.

Obviously, bacon or the like put up and sold in these paper folders is also kept in sanitary condition.

What we claim is:

1. A method of cooking strips of bacon or the like which consists in confining the same in a flat open-ended folder which holds the strips in flat condition, and in subjecting the same to cooking heat applied thereto through said folder.

2. A method of cooking strips of bacon or the like which consists in confining the same in a flat open-ended paper folder which holds the strips in flat condition, and in subjecting the same to cooking heat applied thereto through both of the flat walls of said folder.

3. A method of cooking strips of bacon or the like which consists in confining the same in a flat open-ended paper folder which holds the strips in flat condition, and in subjecting the same to cooking heat applied thereto through both of the flat walls of said folder while said folder is held in an endwise oblique position so that the grease fried from the strip will run out of the lower end of said folder during the complete cooking operation.

In testimony whereof we affix our signatures.

CLARENCE W. CARTER.
CHARLES P. STRITE.